United States Patent [19]

Conti

[11] 4,296,157
[45] Oct. 20, 1981

[54] TUBE WITH WEAKENED SIDE WALL SEGMENT

[76] Inventor: Allen C. Conti, 5294 E. 117th St., Garfield Heights, Ohio 44125

[21] Appl. No.: 22,671

[22] Filed: Mar. 22, 1979

Related U.S. Application Data

[63] Continuation-in-part of Ser. No. 966,678, Dec. 5, 1978, Pat. No. 4,202,530.

[51] Int. Cl.³ .................... D03D 21/00; D03D 49/24
[52] U.S. Cl. ................................. 428/36; 138/121; 138/156; 138/177; 206/631; 174/10; 264/173; 428/43
[58] Field of Search .................. 174/10; 138/156, 177, 138/121; 264/173; 206/605, 631; 428/36, 43

[56] References Cited

U.S. PATENT DOCUMENTS

| | | | |
|---|---|---|---|
| 2,729,696 | 1/1956 | Mapelsden et al. | 174/117 F |
| 3,034,941 | 5/1962 | Hessenthaler et al. | 428/43 |
| 3,070,274 | 12/1962 | Elam | 130/156 UX |
| 3,417,675 | 12/1968 | Ausnit | 93/35 |
| 3,489,183 | 1/1970 | Eberle et al. | 138/156 |
| 3,616,990 | 11/1971 | Powell | 229/66 |
| 3,642,396 | 2/1972 | Meneidis | 264/173 |
| 3,746,201 | 7/1973 | Fujio | 215/38 A |
| 3,796,370 | 3/1974 | Speers et al. | 428/31 |
| 3,812,002 | 5/1974 | Lurie | 428/43 |
| 3,812,282 | 5/1974 | Johansson | 174/10 |
| 3,843,438 | 10/1974 | Gabriel | 156/244 |
| 3,873,018 | 3/1975 | Donnoy | 229/51 TS |
| 4,015,732 | 8/1978 | Slingluff | 264/173 |

Primary Examiner—William R. Dixon, Jr.
Attorney, Agent, or Firm—Thomas H. Murray; Clifford A. Poff

[57] ABSTRACT

An elongated cylinder is essentially comprised of a continuous side wall with a narrow weak wall segment along the length thereof for fracturing by the application of a small force to permit access to the interior of the cylinder along the fractured side wall. The weak side wall segment is in the form of a very thin web section produced by grinding or in a molding operation which may additionally include the filling of the hollowed area of the side wall with a dissimilar material. The article is used for cable placement, varmint protectors for tree trunks, protectors for wire harnesses, protectors for cable splices, and a mold for concrete.

2 Claims, 6 Drawing Figures

TUBE WITH WEAKENED SIDE WALL SEGMENT

CROSS-REFERENCE TO RELATED APPLICATION

This application is a continuation-in-part of application Ser. No. 966,678, filed Dec. 5, 1978 now U.S. Pat. No. 4,202,530.

BACKGROUND OF THE INVENTION

This invention relates to an article of manufacture characteristically in the form of an elongated hollow cylinder having a continuous side wall with a narrow weakened wall segment substantially along the length of the cylinder for access to the interior thereof by fracturing the side wall along the weakened wall segment. Such an article is used to protect a cable while fed into an underground conduit, as a varmint guard for a tree trunk or overhead cable, as a protective enclosure for a wire harness or existing cable, as a removable form for concrete or as a protective cover for a cable splice.

In the placement of underground cables, particularly telephone communication cable and electric utility cable, certain procedures and precautions are necessary to protect the cable from damage during the placement operation. It is well known in the art to use a metal feeder tube for protection and guidance of the cable while fed from a supply reel to an underground conduit. Recent technology advancements to the manufacture and placement of cables have been about the concept of joining the conductors of the cable at one end with connectors prior to the placement of the cable so that the laborious and time-consuming operations required for connecting together the ends of two cables in a single manhole are reduced to a minimum. Because of the increased cost of such cable, special facilities are needed and adequate precautions must be taken to prevent damage to the cable, particularly the sheathing thereof. Typically, for example, a telephone communication cable is about $3\frac{1}{2}$ inches in diameter and the end equipped with connectors may be as large as 11 inches in diameter. Thus, conventional feeder tubes are unsuitable because it is impossible to pass the tube onto or from the end of the cable where the connectors are attached to the conductors. A conventional feeder tube had been cut longitudinally and held together by hinges at one side and latches at the other side. However, such modifications to a metal feeder tube are not adequate solutions to the problem. Alignment between the split tube parts cannot be maintained because of the weight of the feeder tube and the forces imposed upon the feeder tube during the cable pulling operation. As a result, the sheathing of the cable is damaged due to cuts by protruding edges of misaligned tube halves. Because of the forces involved, the cable must be fed very slowly through a divided feeder tube which increases an already-costly placement and handling operation of the cable. The weight of a metal feeder tube is detrimental because support rigging is necessary to prevent unwanted deflections of the cable by the feeder tube.

The article of manufacture according to the present invention is useful not only for cable placement where the need to strip the feed tube from the cable laterally thereof is achieved by fracturing the weakened wall segment, but also in other fields where there is a need to pass a tube onto an article after fracturing the weakened wall segment to form a protective guard. The tube of the present invention is particularly useful to protect the truck of tree saplings against attack by varmints or other animals. The tube is also useful to protect a wire harness having connectors at both ends; for installing a conduit over an existing cable; to provide a covering for protection of a segment of a cable wherein a large diameter splice exists; and for use as a removable form to cast concrete for the production of a fence post or the like.

The weakened side wall segment in the article of manufacture according to the present invention not only eliminates the need for a knife-edge or machine to longitudinally sever the side wall, but also permits severing the side wall at any convenient place, including at the job site and under difficult working conditions. Even when the article includes a transverse rib configuration, the weakened side wall segment is equally effective to form the parting line in the side wall. In the past, a plastic tube with transverse ribs was difficult to sever for producing the parting line even when specially designed machinery was utilized.

SUMMARY OF THE INVENTION

It is an object of the present invention to provide an article of manufacture comprised of an open-ended hollow cylinder having a side wall with a weakened narrow wall segment to define a parting line upon fracturing the weakened wall segment by a relatively small force which is a fraction of the force that is required to fracture the side wall longitudinally of the cylinder along a line remote to the weakened wall segment.

It is a further object of the present invention to provide an open-ended elongated cylinder having a side wall with a weakened narrow wall segment along the length thereof that is capable of severing to form a parting line without the use of tools or special devices, thereby minimizing the expense and time required for establishing a parting line in the wall of the hollow cylinder.

It is a further object of the present invention to provide a flexible tube having a weakened segment or tear-line in the side wall along the longitudinal length thereof to provide a side wall parting line to remove or install the tube by using the parting line to laterally pass an article into or out of the tube.

More particularly, according to the present invention, there is provided an article of manufacture comprising an open-ended elongated hollow cylinder having a continuous side wall with a narrow weak wall segment along substantially the entire length of the cylinder for access to the interior thereof along a parting line defined by fracturing the weak wall segment under an applied force which is a fraction of the force necessary to fracture the side wall along a line remote to the weak wall segment.

The article of manufacture according to the present invention is further characterized by the fact that the weak wall segment is defined by a web comprised of a wall segment with a reduced thickness. The article is preferably comprised of plastic material and a dissimilar plastic material is employed for filling the longitudinal area defining the weak wall segment in which the filler material has a color selected to identify the location of the weak wall segment before and/or after the fracture thereof. The article of manufacture is preferably provided with annular ribs at spaced intervals transversely along the length thereof for increased flexibility. A uniformly thick side wall is preferably used to form the article except at the site of the weakened wall segment.

These features and advantages of the present invention as well as others will be more fully understood when the following description is read in light of the accompanying drawings, in which.

Figure 1:
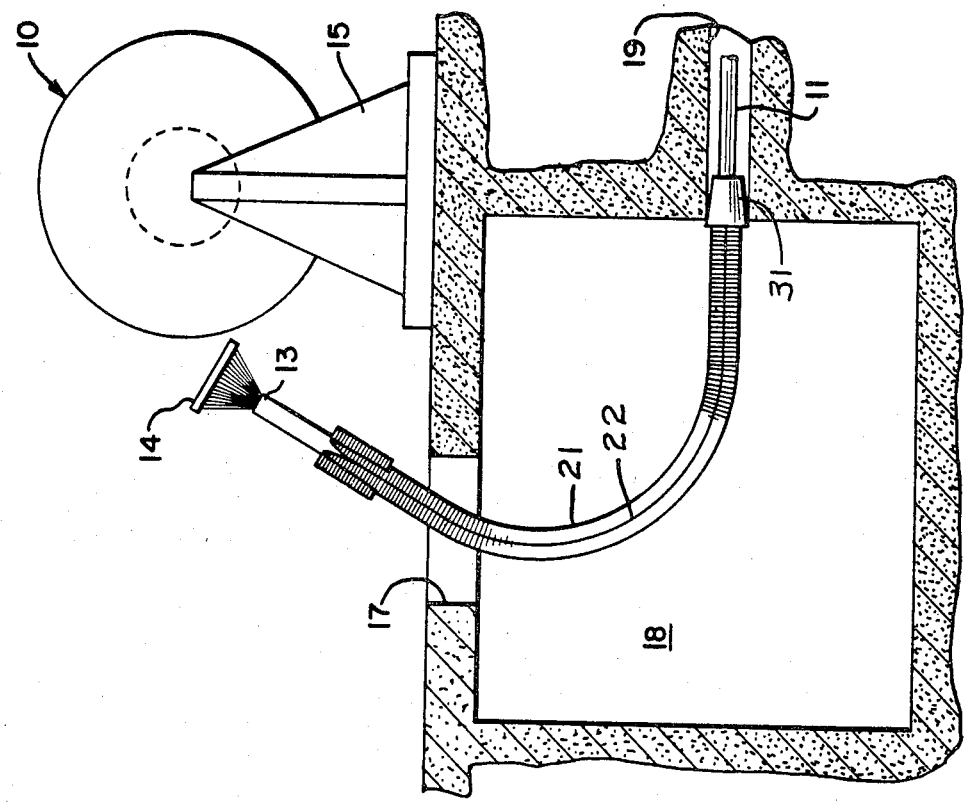
FIG. 1 is an elevational view showing the use of a flexible feeder tube of the present invention for drawing a cable into an underground conduit.

In FIG. 1, there is illustrated a typical arrangement of apparatus employed for carrying out the method of the present invention. Reference numeral 10 identifies a supply reel used for transporting a length of cable 11 which is coiled about an arbor of the reel in a manner to present a plain leading end 12 during the uncoiling operation and a trailing end 13 which is provided with connector members 14 (FIG. 2) previously joined with the conductors extending from the sheathing of the cable. Saddle supports 15 carry the supply reel for rotation about a horizontally-arranged shaft. For the purpose of disclosing the article of manufacture according to the preferred embodiment of the present invention, it will be assumed that the supply reel contains a length of cable of the type commonly used for telephone communications in which the cable is comprised of an outer plastic sheathing used to protect a multiplicity of conductors. At the trailing end of the cable, the conductors are joined with connector members. There may be as many as 2700 pairs of conductors in a single sheathing of the cable whereby the physical size of the connectors 14 at the trailing end of the cable defines a substantial enlargement, e.g., up to about 11 inches over the diameter of the cable, e.g., to 3½ inches. The supply reel is supported adjacent a manhole opening 17 leading to an underground work area 18 wherein an underground conduit 19 defined by a buried PVC pipe, for example, communicates with the work area. The conduits may be formed of numerous well-known structures.

Figure 3:
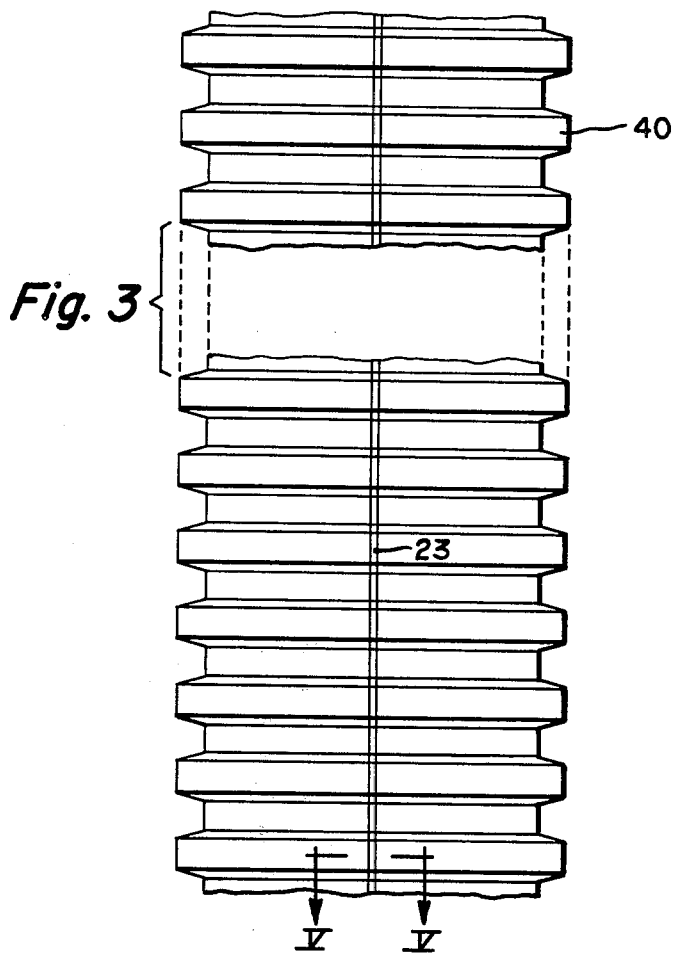
FIG. 3 is an enlarged view of a flexible tube according to the preferred embodiment of the present invention.
Figure 5:
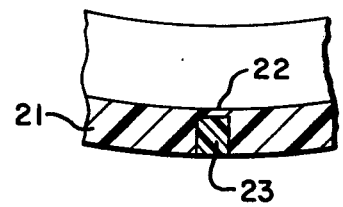
FIG. 5 is a sectional view taken along line V—V of FIG. 3.

The article of manufacture of the present invention includes a length of flexible feeder tube 21 to guide and protect the cable during the passage from the supply reel 10 into the conduit 19. As best shown in FIGS. 3 and 5, the length of feeder tube which is selected has a continuous side wall with a ribbed configuration transversely to the length of the feeder tube to provide flexibility in the longitudinal direction. The side wall of the feeder tube includes a weakened segment 22 extending in the longitudinal direction of the feeder tube. The weakened segment 22 preferably takes the form of coextruded insert material adhered to the material forming the side wall of the tube. For example, high-density polyethylene is one form of material that is useful for producing the flexible feeder tube 21. A different molecular weight polyethylene material is then chosen to form the insert 23. The weakened longitudinal segment to the side wall of the flexible feeder tube may be formed by alternative measures including, for example, providing a thinned wall section during molding or extrusion of the feeder tube. However, after molding, the side walls may be weakened by grinding to form segment 22. While the tube may be constructed of different materials and in different manners, the feeder tube must have at least a substantially continuous internal side wall surface to eliminate possible damage to the cable while passing through the feeder tube. Moreover, the feeder tube must have a weakened side wall segment along its longitudinal length to provide a longitudinal parting line to the side wall.

One end of the flexible feeder tube 21 is joined with a lubricating collar 24 for discharge of a suitable lubricant onto the surface of the cable. One suitable form of collar is shown in U.S. Pat. No. 4,028,473. It is necessary, however, that the lubricating collar be split longitudinally and provided with fastening means for joining together the halves of the split collar. Such fastening means includes a threaded bolt with an eyelet at one end held by a pivot shaft to one-half of the collar by clevis plates. Clevis plates attached to the other half of the collar engage with a nut member which is threaded onto the end of a bolt. The entry side of the collar 24 includes a funnelshaped guide; and at the discharge side of the collar, an annular sleeve extends into the flexible feeder tube. The forces imposed upon the collar by the passage of a cable are sufficient to keep the collar situated at the end of the feeder tube. At the free end of the flexible feeder tube 21, a nozzle 31 is provided and has a conically-tapered portion joined with a cylindrical portion which extends into the feeder tube. The nozzle is longitudinally split into two halves and dowel pins extend between the halves of the nozzle to maintain alignment between the nozzle halves.

Figure 2:
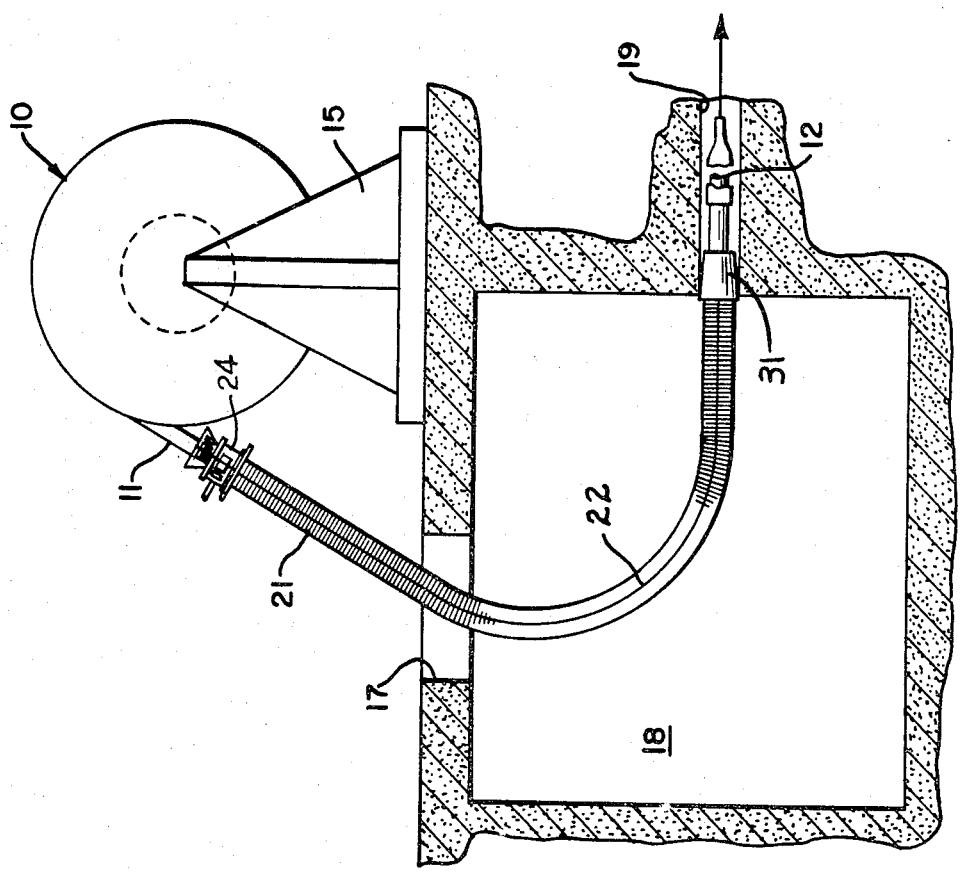
FIG. 2 is a view similar to FIG. 1 but illustrating the manner by which the flexible feeder tube is removed from the cable.

The flexible feeder tube 21 with the lubricating collar at one end and the nozzle at the other end is then joined with conduit 19 by passing the nozzle 31 and a length of the feeder tube through the opening 17 into the work area 18 and then the nozzle is joined to the conduit 19. Typically, because the feeder tube is made of plastic material that is light weight, i.e., preferably about 6 ounces per linear foot, a support rigging for the feeder tube is unnecessary. The pull-line which has been passed through conduit 19 from a distantly-located work area into work area 18 is then fed through nozzle 31, conduit 21 and the lubricating collar 24. The pull-line is then secured to the leading end 12 of the cable. Supply reel 10 is then permitted to rotate as the pull-line is withdrawn along the feeder tube and into conduit 19. While this occurs, lubricant is discharged from the collar 24 onto the surface of the cable to lubricate and protect the cable while passing along the feeder tube and conduit. The length of cable which is contained on the supply reel 10 is typically chosen so that it will extend from work area 18 into a distally-arranged work area from where the pull-line extends. As the trailing end of the cable is unwound from the supply reel 10, pulling of the cable is stopped before the trailing end and connectors 14 reach the lubricating collar 24. The relationship of parts at this point is illustrated in FIG. 2. The lubricating collar is then removed from the end of the feeder tube by sliding it along the cable toward the trailing end thereof. The fasteners are then operated to disconnect the halves of the collar. The collar is then removed from the cable. The feeder tube is then moved longitudinally along the cable toward the trailing end thereof by a distance which is sufficient to disengage the nozzle 31 from the duct 19. After this occurs, the nozzle is withdrawn from the end of the feeder tube. The halves of the nozzles are then separated from one another and removed from the cable. The weakened longitudinal area 22 of the feeder tube is then stressed beyond the elastic limit to sever the side wall of the feeder tube along its entire length. The feeder tube is then stripped from the cable by displacing the feeder tube laterally so that the parting line in the side wall thereof becomes the discharge opening from which the cable passes from within the feeder tube. After the feeder tube is stripped from the cable, the cable is drawn into the duct 19 by a desired distance so that the terminals 14 at the end thereof are positioned in a desired location within the work area 18 for joining with the terminals of another cable which has been previously drawn into ductwork extending in the opposite direction or will be drawn into such ductwork. A short section of previously-fractured tube is wrapped around the cable and moved into the duct to support and protect the cable edge against damage which would otherwise occur upon contact with the edge of the duct. After the trailing end of the two sets of cables has been positioned into a desired relation within the work area 18, the connectors on each terminal end are coupled together to provide electrical continuity between the conductors of both cables.

A short length of tubing, preferably having a diameter larger than the diameter of the tubing used to place the cable and without a film of lubricant, is selected and fractured along the weakened side wall segment thereof. The parting line thus created in the tube forms a passageway for the cable and adjoined connectors into the interior of the tube. After positioning the short length of tube over the connectors, an outer wrap of protective material is used to form an airtight seal and hold the length of tube in place.

The trunk of a tree sapling is conveniently protected against attack by varmints or other animals by using the parting line in a length of tube as a passageway for the trunk of the sapling. An additional wrapping or holding device is usually unnecessary. As the size of the tree sapling increases, the tube expands without adverse affect upon the trunk. Moreover, the trunk of a tree sapling may be passed into a tube and the side wall fractured by the growth enlargement of the trunk. The tube article of the present invention is used in the same manner to protect a wire harness with or without connectors at both ends and to provide a conduit to protect a length of existing cable while extending in a deteriorated conduit. A fence post is easily cast by using a selected length of tube to provide a form. After pouring and curing of the concrete, the tube is easily removed by fracturing, as by tearing under a handapplied force, the weakened side wall. The article of manufacture of the present invention is also useful to protect overhead cable against attack by squirrels and other animals. A short length of tube about 12-15 inches long, when loosely placed on a cable adjacent a pole, offers no stable support for the animal.

Figure 6:
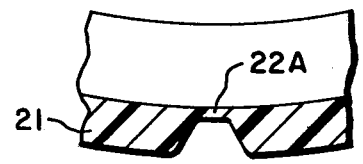
FIG. 6 is a view similar to FIG. 3 but illustrating a second embodiment of the flexible tube according to the present invention.
Figure 4:
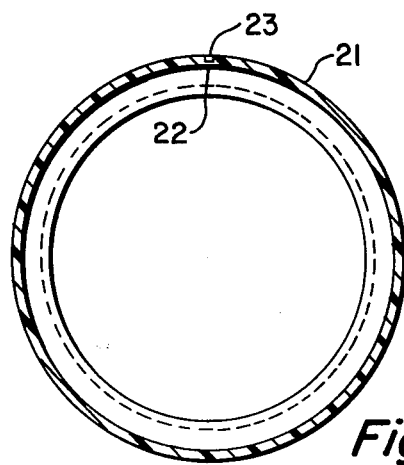
FIG. 4 is an end view of the flexible tube shown in FIG. 3.

As described hereinbefore, the tube of the present invention shown in FIGS. 3-5 is preferably formed with transverse ribs 40 by a molding operation after the tube is extruded and the weakened side wall segment 22 has been formed. This segment takes the form of a web comprised of an arcuate section of the wall having a reduced thickness as compared with the remaining part of the tube wall which preferably has a uniform thickness. The ribs 40 are parallel and spaced apart along the length of the tube to not only strengthen but also provide flexibility. The ribs, however, are not essential to the use of the article in all contemplated fields. FIG. 6 illustrates a second embodiment of the present invention wherein after a tube is extruded, a grinding operation is carried out to remove about 60-70% of the plastic material from a longitudinal portion of the side wall and provide the weakened side wall segment 22A.

Although the invention has been shown in connection wwith certain specific embodiments, it will be readily apparent to those skilled in the art that various changes in form and arrangement of parts may be made to suit requirements without departing from the spirit and scope of the invention.

I claim as my invention:

1. A tubular apparatus to protect a cable from damage comprising an open-ended elongated hollow tube having a side wall with a continuous internal surface of a first thermoplastic material and of substantially uniform thickness throughout except for a narrow arcuate web segment of reduced thickness along substantially the entire length of the tube to create a line of weakness for access to the interior of said tube along a parting line defined by fracturing the arcuate web segment under an applied force, and a coextruded insert of a second thermoplastic material dissimilar to said first thermoplastic material adhered to the exterior wall surface of said arcuate web segment to maintain said line of weakness.

2. The apparatus according to claim 1 wherein said tube is corrugated to form ribs for flexibility along the length thereof.

* * * * *